United States Patent
Liu et al.

(10) Patent No.: US 12,479,494 B1
(45) Date of Patent: Nov. 25, 2025

(54) BEARING ASSEMBLY SYSTEM FOR VEHICLE STEERING SYSTEMS

(71) Applicant: Steering Solutions IP Holding Corporation, Saginaw, MI (US)

(72) Inventors: Chao (Super) Liu, Jiangsu (CN); Shenbing (Assur) Wen, Jiangsu (CN); Hui Ma, Jiangsu (CN); Yuki Ye, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/960,367

(22) Filed: Nov. 26, 2024

(30) Foreign Application Priority Data

Nov. 22, 2024 (CN) .......................... 202411679323.8

(51) Int. Cl.
  *B62D 1/187* (2006.01)
  *B62D 1/16* (2006.01)
  *B62D 1/185* (2006.01)
  *B62D 1/19* (2006.01)
  *F16C 23/04* (2006.01)
(52) U.S. Cl.
  CPC ............... *B62D 1/16* (2013.01); *B62D 1/185* (2013.01); *B62D 1/187* (2013.01); *B62D 1/195* (2013.01); *F16C 23/045* (2013.01)
(58) Field of Classification Search
  CPC ................................. B62D 1/16; F16C 23/045
  See application file for complete search history.

(56) References Cited

U.S. PATENT DOCUMENTS

| | | | | |
|---|---|---|---|---|
| 4,136,982 A | * | 1/1979 | Sagady | F16D 1/116 403/359.5 |
| 4,223,911 A | * | 9/1980 | Cymbal | B60R 16/027 439/15 |
| 2005/0184500 A1 | * | 8/2005 | Finkbeiner | B62D 1/195 280/777 |
| 2020/0406952 A1 | * | 12/2020 | Gosztyla | B62D 1/184 |
| 2021/0061342 A1 | * | 3/2021 | Buzzard | F16F 7/125 |

(Continued)

FOREIGN PATENT DOCUMENTS

| | | | | |
|---|---|---|---|---|
| DE | 102016119519 A1 | * | 4/2018 | ............... B62D 1/16 |
| EP | 1790550 A1 | * | 5/2007 | ............. B62D 1/184 |

(Continued)

OTHER PUBLICATIONS

English translation of OA regarding corresponding DE App. No. 10 2024 135 671.5; issued May 13, 2025.

*Primary Examiner* — Nicole T Verley
(74) *Attorney, Agent, or Firm* — Dickinson Wright PLLC

(57) ABSTRACT

A bearing assembly system for a vehicle steering system includes a tubular member having a radially inwardly protruding shoulder, the tubular member having a stake portion angling radially inwardly, the stake portion having a stake surface. The bearing assembly system also includes a bearing disposed within the tubular member and in contact with the radially inwardly protruding shoulder. The bearing assembly system further includes a retainer disposed within the tubular member and in contact with the bearing, the bearing disposed between the retainer and the radially inwardly protruding shoulder, the retainer having an angled surface, the angled surface in flush contact with the stake surface in a fully assembled condition.

15 Claims, 4 Drawing Sheets

(56) References Cited

U.S. PATENT DOCUMENTS

| | | | | |
|---|---|---|---|---|
| 2022/0212712 A1* | 7/2022 | Rouleau | ................. | B62D 1/181 |
| 2022/0297738 A1* | 9/2022 | Dubay | .................... | B62D 1/16 |
| 2023/0192175 A1* | 6/2023 | Tinnin | ................... | B62D 1/195 |
| | | | | 74/493 |
| 2023/0234632 A1* | 7/2023 | Bonkowski | ............ | B62D 1/185 |
| | | | | 74/493 |
| 2023/0242174 A1* | 8/2023 | Caverly | .................. | B62D 1/19 |
| | | | | 280/775 |

FOREIGN PATENT DOCUMENTS

| | | | | | |
|---|---|---|---|---|---|
| EP | 3798092 | B1 | * | 7/2023 | ............ B62D 1/181 |
| JP | 2013014213 | A | | 1/2013 | |
| JP | 2014051183 | A | | 3/2014 | |
| KR | 101325072 | B1 | * | 11/2013 | ............... B62D 1/18 |
| KR | 20180001368 | A | * | 1/2018 | ............... B62D 1/16 |
| WO | WO-2007067249 | A1 | * | 6/2007 | ............ F16H 15/28 |
| WO | WO-2016065168 | A1 | * | 4/2016 | ............ F16C 19/545 |
| WO | WO-2018134690 | A1 | * | 7/2018 | ............... F16D 1/04 |

* cited by examiner

BEARING ASSEMBLY SYSTEM FOR VEHICLE STEERING SYSTEMS

CROSS REFERENCE TO RELATED APPLICATION

This application claims the benefits of priority to Chinese Patent Application No. 202411679323.8, filed Nov. 22, 2024, the disclosure of which is incorporated by reference herein in its entirety.

TECHNICAL FIELD

The following description relates to vehicle steering systems and, more particularly, to a bearing assembly system for vehicle steering systems.

BACKGROUND

A vehicle, such as a car, truck, sport utility vehicle, crossover, mini-van, marine craft, aircraft, all-terrain vehicle, recreational vehicle, or other suitable vehicles, include various steering systems to carry out steering maneuvers. These steering systems typically include a steering column assembly for translating steering input to an output that interacts with a steering linkage to ultimately cause the vehicle wheels to turn.

The steering column assembly may include one or more jackets which house a portion of a steering shaft. In one configuration, an upper jacket is received within a lower jacket and may translate, or telescope, relative to the lower jacket to adjust the position of the steering column assembly. In such a configuration, the outer diameter of the upper jacket is at least partially defined by components connected (directly or indirectly) to the upper jacket. For example, a combination switch may partially dictate the outer diameter of the upper jacket.

A combination switch is a lever-style switch that controls multiple functions, including the headlights, turn signals and windshield wipers. As combination switches become smaller, the upper jacket outer diameter is becoming smaller. This requires a smaller bearing located within the upper jacket for interaction with the rotatable steering shaft. Prior bearings in this specific location suffer from a few negative performance aspects. First, when the force of pressing the bearing into the jacket is too large, rotation friction of the bearing is degraded, the outer diameter of the jacket may expand and effect the interface with the combination switch, and the holding force of the overall steering column assembly is unsatisfactory. A rolling feature or staking feature on the jacket used to press the bearing may worsen the rotation friction of the bearing. The thickness of the jacket may be too small to use a common structure to locate the bearing with a circlip. Finally, a no-back washer can locate the bearing on the jacket, but the retention load is low.

SUMMARY

According to one aspect of the disclosure, a steering column assembly includes a jacket defining a bore with an inner jacket diameter and having an open axial end, the jacket having a stake portion angling radially inwardly into the bore, the stake portion having a stake surface. The steering column assembly also includes a steering shaft at least partially disposed within the bore of the jacket, the steering shaft rotatable within, and relative to, the jacket. The steering column assembly further includes a bearing assembly system. The bearing assembly system includes a bearing disposed within the bore of jacket, the bearing having a first face, a second face opposite the first face, an outer bearing diameter, and an inner bearing diameter. The bearing assembly system also includes a retainer formed of a resilient material, the retainer in contact with the first face of the bearing and the inner jacket diameter, the retainer having an angled surface which is non-parallel to the first face of the bearing, the angled surface in flush contact with the stake surface in a fully assembled condition.

According to another aspect of the disclosure, a bearing assembly system for a vehicle steering system includes a tubular member having a radially inwardly protruding shoulder, the tubular member having a stake portion angling radially inwardly, the stake portion having a stake surface. The bearing assembly system also includes a bearing disposed within the tubular member and in contact with the radially inwardly protruding shoulder. The bearing assembly system further includes a retainer disposed within the tubular member and in contact with the bearing, the bearing disposed between the retainer and the radially inwardly protruding shoulder, the retainer having an angled surface, the angled surface in flush contact with the stake surface in a fully assembled condition.

According to another aspect of the disclosure, a method of assembling a steering column jacket assembly is provided. The method includes pressing a bearing into a bore defined by a jacket to have contact between the bearing and a radially inwardly protruding shoulder of the jacket to define an axial position of the bearing within the jacket. The method also includes pressing a retainer into the bore of the jacket to contact the bearing. The method further includes forming a stake of the jacket to angle radially inwardly into the bore of the jacket to establish flush contact between an angled surface of the retainer and a stake surface of the stake.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering systems. These steering systems typically include a steering column assembly for translating steering input to an output that interacts with a steering linkage to ultimately cause the vehicle wheels to turn.

Figure 1:
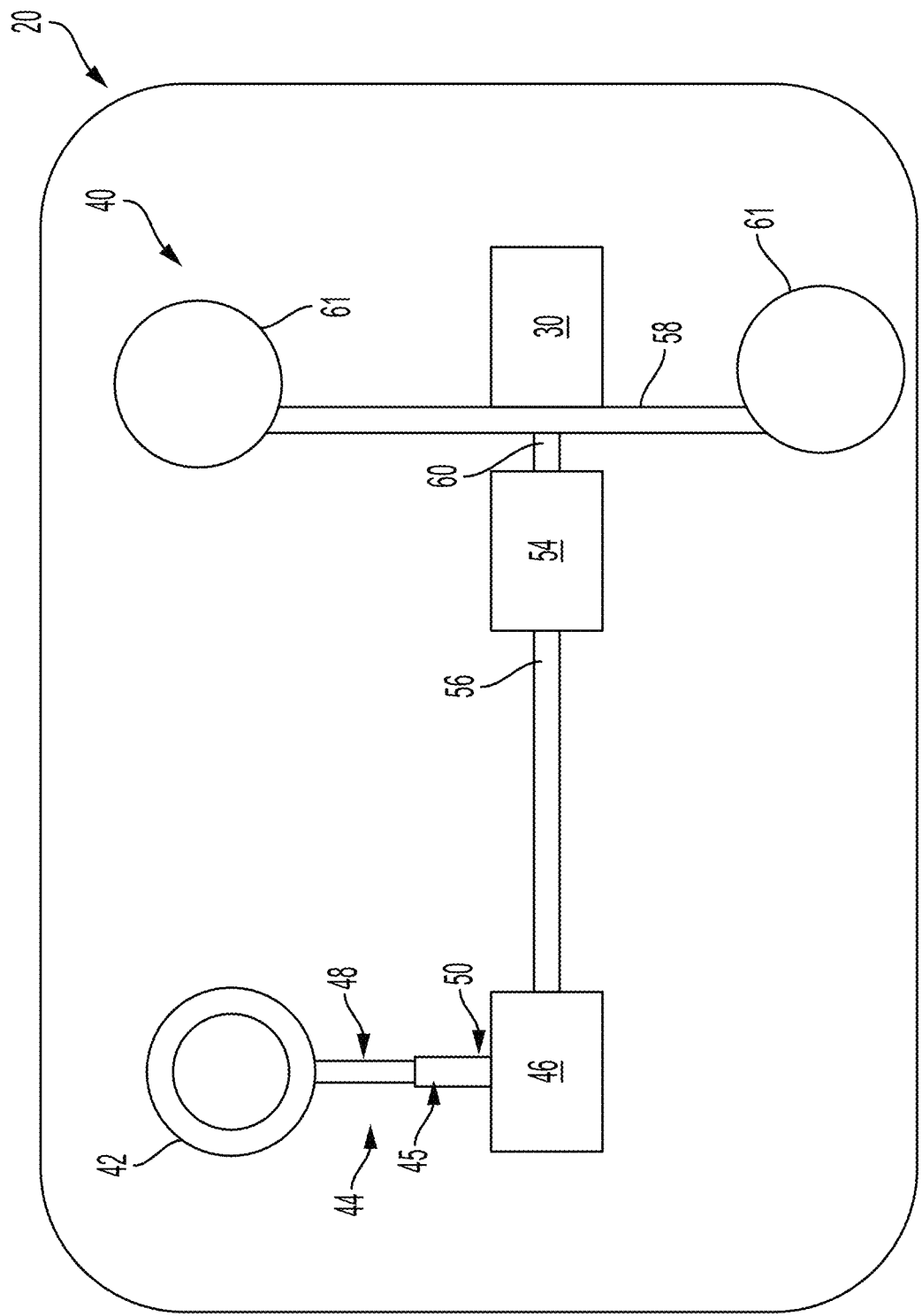
FIG. 1 schematically illustrates a vehicle with a steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

The vehicle 20 also includes a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along a longitudinal axis A from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, an upper jacket 48 and a lower jacket 50 that are axially adjustable with respect to one another. The upper jacket 48 and the lower jacket 50 are permitted to move axially with respect to one another to allow an operator to adjust the position of the steering input device 42 and during an impact event for safety purposes. The relative axial movement is described herein as being telescoping, wherein the upper jacket 48 telescopes within the lower jacket 50 over a range of axial positions from an extended column position to a retracted column position. The steering column assembly 44 may include additional portions provide rake and/or tilt movement.

A steering gear assembly 54 may connect to the output assembly 46 via a steering gear input shaft 56. The steering gear assembly 54 may be configured as a rack-and-pinion, a recirculating ball-type steering gear, or any other type of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 61.

Figure 2:
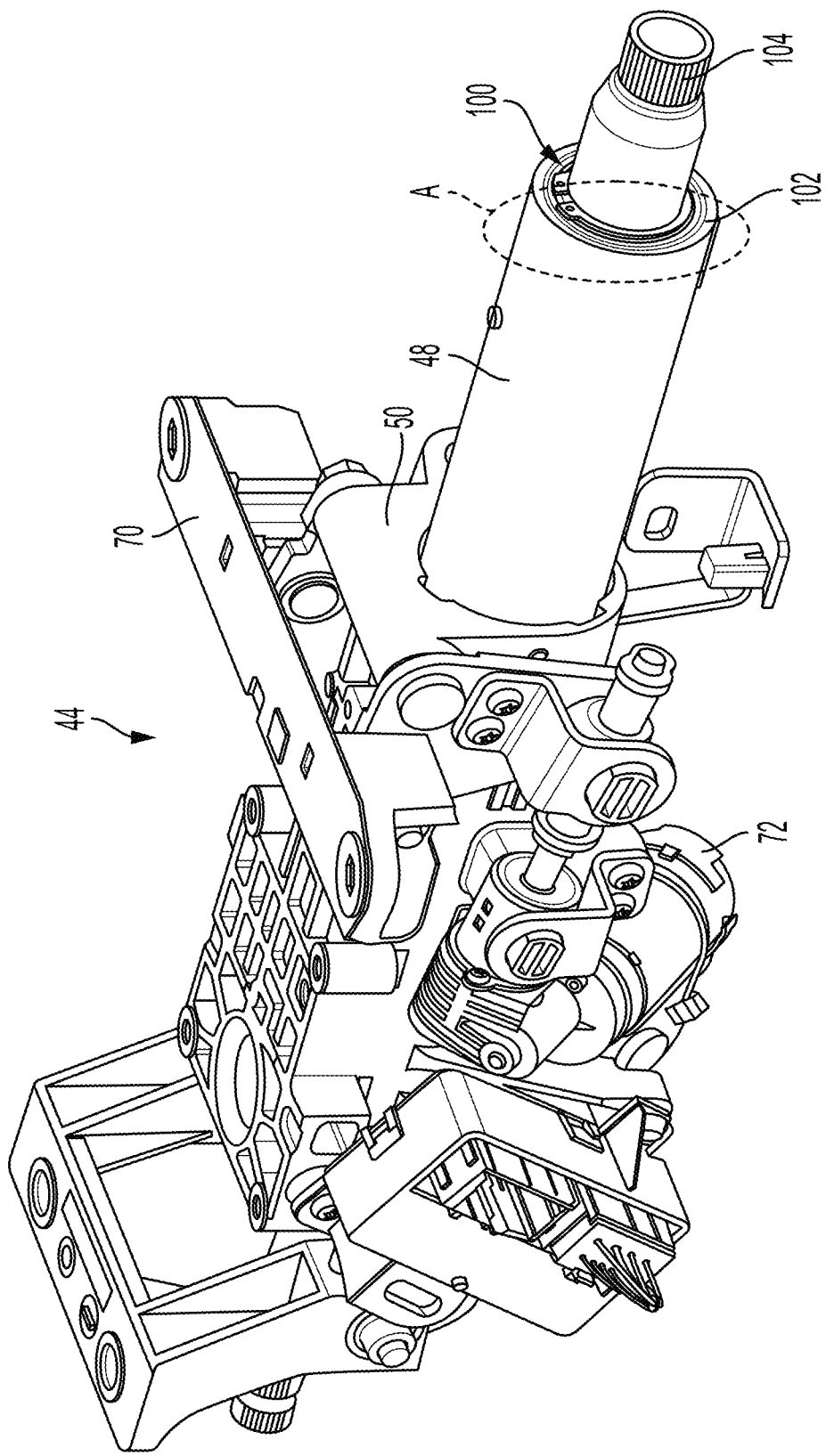
FIG. 2 is a perspective view of a steering column assembly of the steering system.

FIG. 2 illustrates a portion of the steering column assembly 44. As shown, the upper jacket 48 is received within the lower jacket 50. One or more mounting brackets 70 may be provided to connect the steering column assembly 44 to a fixed structural component of the vehicle 20. The illustrated steering column assembly 44 includes one or more electric actuators 72 to provide electrically powered telescope and/or rake adjustment capability.

A bearing assembly system 100 is provided within the upper jacket 48 at the location referenced with 'A' in FIG. 2. The bearing assembly system 100 is disposed proximate a first end 102 of the upper jacket 48. The bearing assembly system 100 is positioned to retain a position of a steering shaft 104 which extends within a bore defined by an inner diameter of the upper jacket 48 and possibly into the lower jacket 50. The steering shaft 104 is rotatable in response to steering feedback provided by one or more actuators and during operator inputs from the steering input device 42 (FIG. 1) and the bearing assembly system 100 facilitates stable rotation of the steering shaft 104.

Figure 3:
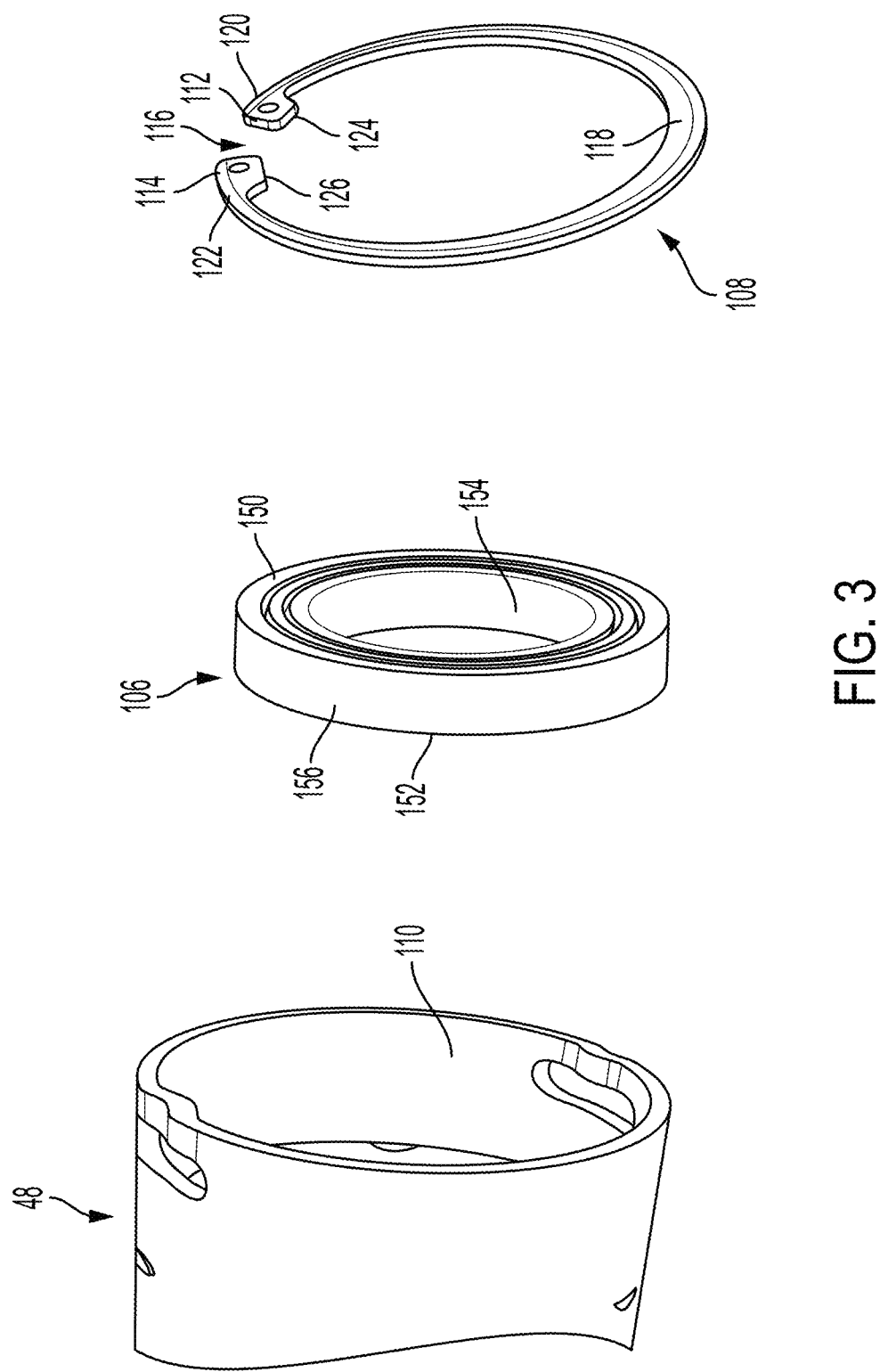
FIG. 3 is a disassembled view of a bearing assembly system of the steering column assembly.

Referring now to FIG. 3, the bearing assembly system 100 is shown in more detail. The bearing assembly system 100 is illustrated in a disassembled view in FIG. 3. The bearing assembly system 100 includes a portion of the upper jacket 48 which is proximate the first end 102 of the upper jacket 48, a bearing 106 and a retainer 108. The bearing 106 is sized to fit within the inner diameter 110 of the upper jacket 48 at the first end 102 of the upper jacket 48. The bearing 106 may be any suitable bearing for the application of use. The bearing 106 includes a first face 150 and a second face 152 on opposite axial sides of the bearing 106. The bearing also includes an inner bearing diameter 154 and an outer bearing diameter 156. The second face 152 of the bearing is disposed further from an open end of the upper jacket 48, when compared to the axial distance between the first face 150 and the open end of the upper jacket 48.

The retainer 108 extends circumferentially from a first retainer end 112 to a second retainer end 114. In the illustrated embodiment, the retainer 108 is not a complete ring-like structure, as there is a gap 116 defined between the first retainer end 112 and the second retainer end 114. The size of the gap 116, relative to the overall shape of the retainer 108, may vary depending on the particular application of use. In some embodiments, the retainer 108 may form a complete loop or ring.

In the illustrated embodiment, the retainer 108 includes a retainer body portion 118 which extends between a first end segment 120 and a second end segment 122. The first end segment 120 and the second end segment 122 are each continuations—in the circumferential direction of the retainer 108—of the retainer body portion 118 and include a radially inwardly projecting extension, i.e., first end extension 124 and second end extension 126.

The retainer 108 is formed of a resilient material, such that it may undergo elastic deformation when forces are exerted thereon. The retainer 108 may be formed of any suitable material which provides the desired tension force on components which it is in contact with. For example, the retainer 108 may be formed of spring metal, such as spring steel. By way of non-limiting example, the retainer 108 may be formed of steel SAE J403 Grade 1060-1090.

Figure 4:
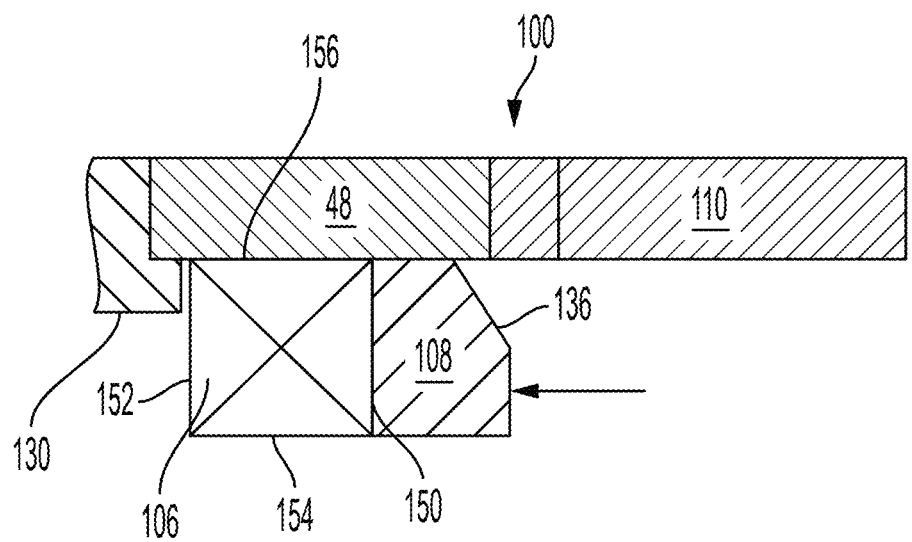
FIG. 4 is a cross-sectional view of the bearing assembly system in a partially assembled condition.
Figure 5:
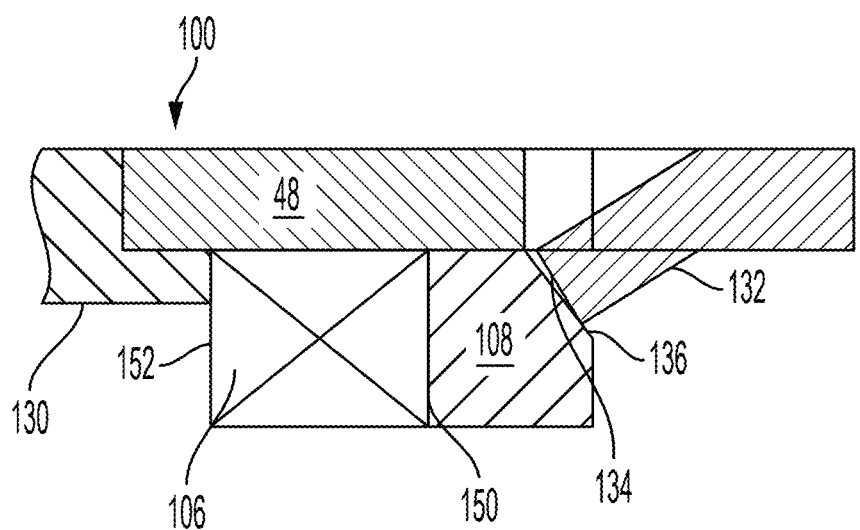
FIG. 5 is a cross-sectional view of the bearing assembly system in a fully assembled condition.

FIGS. 4 and 5 are cross-sectional views of the bearing assembly system 100 at different assembly conditions of the system 100. FIG. 4 illustrates a partially assembled condition of the bearing assembly system 100. At this stage of assembly, the bearing 106 has been pressed within the upper jacket 48 and along an outer surface of the steering shaft 104 (FIG. 2). In this position, the bearing 106 is disposed between the inner diameter of the upper jacket 48 and the outer surface of the steering shaft 104. The bearing 106 is pressed to contact a shoulder 130 of the upper jacket 48. In particular, the second face 152 of the bearing 106 is in contact with the shoulder 130 in an assembled condition. The shoulder 130 is part of the inner diameter of the upper jacket 48 and extends radially inwardly relative to adjacent parts of the inner diameter of the upper jacket 48. The shoulder 130 defines an axial stop location during pressing of the bearing 106 within the upper jacket 48 to ensure a desired axial position of the bearing 106.

With continued reference to the assembly stage illustrated in FIG. 4, the retainer 108 is pressed to an axial position in which contact is made between the retainer 108 and a radially outer portion of the first face of the bearing 106. The size of the retainer 108 and the spring force of the retainer 108 provide a tension and friction force from the outer diameter of the retainer 108 to the inner diameter of the upper jacket 48.

Referring now to FIG. 5, the fully assembled stage of the bearing assembly system 100 is illustrated. At this stage, the upper jacket 48 is staked to contact the retainer 108. In particular, a portion 132 (also referred to as "stake") of the upper jacket 48 is bent radially inwardly to adjust the angle of a stake surface 134 and to move the stake 132 radially inwardly into the bore of the jacket to block removal of the retainer 108. The angle of the stake surface 134 is aligned with an angled surface 136 of the retainer 108, as shown. The angled surface 136 of the retainer 108 is a bevel formed on the radially outer surface of the retainer 108. The particular complementary angles of the stake surface 134 of the stake 132 and the angled surface 136 of the retainer 108 may vary depending on the desired holding force. The angled surface 136 of the retainer and the stake surface 134 are each oriented non-parallel to the first face 150 and the second face 152 of the bearing 106. The angled surface 136 is in flush contact with the stake surface 134 in a fully assembled condition.

The bearing assembly system 100 provides a high retention force based on the angled surface contact between the stake 132 and the retainer 108, in contrast to a stake that interacts with a non-complementary angle of another retainer. Additionally, a low bearing press force is needed since the retainer 108 provides sufficient holding force. The bearing assembly system 100 may be located onto a stamping jacket with a thickness too small for a conventional retainer ring.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A steering column assembly comprising:
    a jacket defining a bore with an inner jacket diameter and having an open axial end, the jacket having a stake portion angling radially inwardly into the bore, the stake portion having a stake surface;
    a steering shaft at least partially disposed within the bore of the jacket, the steering shaft rotatable within, and relative to, the jacket; and
    a bearing assembly system comprising:
        a bearing disposed within the bore of jacket, the bearing having a first face, a second face opposite the first face, an outer bearing diameter, and an inner bearing diameter; and
        a retainer formed of a resilient material, the retainer in contact with the first face of the bearing and the inner jacket diameter, the retainer having an angled surface which is non-parallel to the first face of the bearing, the angled surface in flush contact with the stake surface in a fully assembled condition.

2. The steering column assembly of claim 1, wherein the retainer extends circumferentially from a first retainer end to a second retainer end, wherein the first retainer end and the second retainer end define a gap therebetween.

3. The steering column assembly of claim 2, wherein the first retainer end includes a radially inwardly projecting extension.

4. The steering column assembly of claim 3, wherein the second retainer end includes a radially inwardly projecting extension.

5. The steering column assembly of claim 1, wherein the jacket is an upper jacket telescopingly received within a lower jacket.

6. The steering column assembly of claim 1, wherein the second face of the bearing is in contact with a radially inwardly protruding shoulder of the jacket to define an axial position of the bearing.

7. The steering column assembly of claim 1, wherein the retainer is formed of spring metal.

8. A bearing assembly system for a vehicle steering system comprising:
    a tubular member having a radially inwardly protruding shoulder, the tubular member having a stake portion angling radially inwardly, the stake portion having a stake surface;
    a bearing disposed within the tubular member and in contact with the radially inwardly protruding shoulder; and
    a retainer disposed within the tubular member and in contact with the bearing, the bearing disposed between the retainer and the radially inwardly protruding shoulder, the retainer having an angled surface, the angled surface in flush contact with the stake surface in a fully assembled condition.

9. The bearing assembly system of claim 8, wherein the tubular member is a steering column jacket.

10. The bearing assembly system of claim 9, wherein the steering column jacket is an upper jacket telescopingly received within a lower jacket.

11. The bearing assembly system of claim 8, wherein the retainer extends circumferentially from a first retainer end to a second retainer end, wherein the first retainer end and the second retainer end define a gap therebetween.

12. The bearing assembly system of claim 11, wherein the first retainer end includes a radially inwardly projecting extension.

13. The bearing assembly system of claim 12, wherein the second retainer end includes a radially inwardly projecting extension.

14. The bearing assembly system of claim 8, wherein the retainer is formed of spring metal.

15. A method of assembling a steering column jacket assembly comprising:

pressing a bearing into a bore defined by a jacket to have contact between the bearing and a radially inwardly protruding shoulder of the jacket to define an axial position of the bearing within the jacket;

pressing a retainer into the bore of the jacket to contact the bearing; and forming a stake of the jacket to angle radially inwardly into the bore of the jacket to establish flush contact between an angled surface of the retainer and a stake surface of the stake.

* * * * *